United States Patent

[11] 3,616,212

[72] Inventors Shigeo Abe
Tokyo;
Akira Furuya, Machida-shi; Ryo Okachi, Machida-shi, all of Japan
[21] Appl. No. 758,591
[22] Filed Sept. 9, 1968
[45] Patented Oct. 26, 1971
[73] Assignee Kyowa Hakko Kogyo Co., Ltd.
Tokyo, Japan
[32] Priority Sept. 27, 1967
[33] Japan
[31] 42/61679

[54] PROCESS FOR PRODUCTION OF INOSINE AND 5'-GUANYLIC ACID NUCLEOTIDES
15 Claims, No Drawings

[52] U.S. Cl. .................................................. 195/28 N
[51] Int. Cl. ................................................. C12d 13/06

[50] Field of Search ............................................ 195/28 N

[56] References Cited
UNITED STATES PATENTS
3,296,087  1/1967  Mitsugi et al. ................ 195/28 N

*Primary Examiner*—Alvin E. Tanenholtz
*Attorney*—Craig, Antonelli, Stewart & Hill ABSTRACT: A process for producing inosine and 5'-guanylic acid nucleotides by fermentation which comprises culturing a mutant strain having the ability to accumulate inosine and simultaneously to convert 5'-xanthylic acid into 5'-guanylic acid nucleotides under aerobic conditions in an aqueous nutrient medium containing 5'-xanthylic acid. Strains advantageously employed are *Brevibacterium ammoniagenes* ATCC 21264 and *Corynebacterium glutamicum* ATCC 21266.

PROCESS FOR PRODUCTION OF INOSINE AND 5'-GUANYLIC ACID NUCLEOTIDES

The present invention relates to a process for producing inosine and 5'-guanylic acid system nucleotides. More particularly, it relates to a process for the production of inosine and 5'-guanylic acid nucleotides by fermentation. Even more particularly, the invention relates to a process for the production of inosine and 5'-guanylic acid nucleotides such as 5'-guanosine-1-phosphoric acid (5'-GDP), and 5'-guanosine-2-phosphoric acid (5'-GDP) and 5'-guanosine-3-phosphoric acid (5'-GTP) by fermentation with micro-organisms having particular characteristics.

Inosine, which is hypoxanthine riboside, is found in meat and meat extracts and in sugar beets. Inosine as well as the 5'-guanylic acid nucleotides have found wide uses and applications in the biochemical field.

One of the objects of the present invention is to provide an improved process for the production of inosine and 5'-guanylic acid nucleotides which overcomes the disadvantages and deficiencies of the prior art methods.

Another object of the present invention is to provide a process for producing inosine and 5'-guanylic acid nucleotides by fermentation with particular micro-organisms which may be carried out in an efficacious and simple manner.

A further object of the invention is to provide a process for producing said products by fermentation which may be carried out advantageously and economically on an industrial scale to give a high yield of product.

A still further object of the invention is to provide inosine and 5'-guanylic acid system nucleotides such as 5'-guanosine-1-phosphoric acid, 5'-guanosine-2-phosphoric acid and 5'-guanosine-3-phosphoric acid.

These and other objects and advantages of the present invention will become apparent to those skilled in the art from a consideration of the following specification and claims.

In accordance with the present invention, it has been found that cultivating or culturing a micro-organism having the ability to produce inosine and a capacity for converting 5'-xanthylic acid into 5'-guanylic acid nucleotides with a high yield in a culture medium containing 5'-xanthylic acid makes it possible to accumulate inosine and to simultaneously convert 5'-xanthylic acid into 5-guanylic acid nucleotides. The products may then be recovered as desired from the fermentation liquor in high yield.

The present invention has resulted from many years of study by the inventors on the production of nucleotides and nucleosides by fermentation and the discovery of micro-organism mutants having the ability to accumulate inosine and the capacity for converting 5'-xanthylic acid into 5'-guanylic acid nucleotides in high yield. Micro-organism strains employed in the present invention are mutants obtained by subjecting micro-organisms belonging to various genera to the application of ultraviolet rays or cobalt 60-$\gamma$-rays or to chemical treatment with nitrous acid, dimethyl sulfate, or nitrosoguanidine. The resulting mutants are characterized in requiring adenine compounds (adenine, adenosine or adenylic acid) for their growth or that the growth thereof is accelerated by purine compounds. As noted above, these mutants cause the accumulation of large amounts of inosine in the culture liquor. Moreover, the mutants possess the property of converting 5'-xanthylic acid, which is added to the culture medium, into 5'-guanylic acid nucleotides in high yield. Mutants having other nutrient-requiring properties such as, for example, amino acids, vitamins, purines, pyrimidines and the like, as well as the above characteristics, are also employable in the process of the present invention.

Preferred strains to be employed in the present invention include *Brevibacterium ammoniagenes* iXG-21 ATTC 21264 and *Corynebacterium glutamicum* iXG-31 ATCC 21266.

Either a synthetic culture medium or a natural nutrient medium is suitable for the cultivation as long as it contains the essential nutrients for the growth of the micro-organism strain employed. Such nutrients are well known in the art and include substances such as a carbon source, a nitrogen source, inorganic compounds and the like which are utilized by the micro-organism employed in appropriate amounts. Exemplary of carbon sources which may be employed in the aqueous nutrient medium are carbohydrates such as glucose, fructose, maltose, sucrose, starch, starch hydrolysate, waste molasses, etc., or any other suitable carbon source such as glycerol, mannitol, sorbitol, organic acids such as acetic acid, lactic acid, glutamic acid, etc. These substances may be used either singly or in mixtures of two or more. As a nitrogen source, various kinds of inorganic or organic salts or compounds, such as urea, ammonia, or ammonium salts such as ammonium chloride, ammonium sulfate, ammonium nitrate, ammonium phosphate, etc., or natural substances containing nitrogen, such as cornsteep liquor, yeast extract, meat extract, fishmeal, peptone, bouillon, casein hydrolysates, fish solubles, rice bran extract, casamino acid, etc. may be employed. These substances may also be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc. Moreover, it may also be necessary to add certain essential nutrients to the culture medium, depending upon the particular micro-organism employed, such as amino acids and/or vitamins, for example, biotin, thiamine, cobalamin and the like, as well as adenine compounds as noted above.

It is sometimes advantageous to add a surface-active agent to the culture medium. Surface-active agents which may be employed may be either anionic, cationic or nonionic. Such agents are well known in the art and, generically, comprise substances such as the sodium salts of high molecular weight alkyl sulfates or sulfonates, polyoxyethylene glycol derivatives, higher fatty acids having from 12 to 20 carbon atoms, for example, lauric acid, myristic acid, palmitic acid, stearic acid, oleic acid and the like, organic esters of higher fatty acids, such as sorbitan monooleate, etc. Specific examples of surface-active agents which may be employed are to be found in, for example, copending application Ser. No. 643,832, filed on June 6, 1967, the disclosure of which is herein expressly incorporated by reference.

Pursuant to the present invention, a mutant strain having the ability to accumulate inosine and simultaneously to convert 5'-xanthylic acid, added to the medium, into 5'-guanylic acid nucleotides is cultivated in an aqueous nutrient medium. The 5'-xanthylic acid may be added to the medium at the time when the micro-organism is inoculated therein, or it may be added after some of the growth of the micro-organism has taken place. The amount of 5'-xanthylic acid added to the medium generally ranges from about 5.0 to 30.0 mg./ml., but it is to be understood that the concentration thereof added to the medium will vary depending upon the particular strain employed. Very pure 5'-xanthylic acid itself, or 5'-xanthylic acid-containing substances as well as culture liquors containing 5'-xanthylic acid (prepared by fermentation), may be used as the additive to the medium, so long as the particular form of xanthylic acid employed does not adversely affect the growth of the micro-organism, the accumulation of inosine or the conversion into 5'-guanylic acid nucleotides.

The fermentation is conducted under aerobic conditions, such as aerobic shaking of the culture or with aeration and agitation of a submerged culture, at a temperature of, for example, about 20° to 40° C. and at a pH of about, for example, 5.0 to 9.0. The pH of the medium may be adjusted appropriately with hydrochloric acid, sulfuric acid, phosphoric acid, urea, aqueous ammonia, sodium hydroxide, potassium hydroxide etc., in accordance with the strain used, during the cultivation procedure. After about 2 to 6 days of culturing under these conditions, large quantities of 5'-guanylic acid nucleotides or a mixture of 5'-guanylic acid nucleotides together with inosine are accumulated in the culture liquor and the micro-organism cells. After the completion of culturing, the accumulated products can be recovered as single, individual substances or as a mixture by conventional means, such as ion exchange resin treatment, precipitation with metallic salts, adsorption, extraction, chromatography, or the like.

The following examples are given merely as illustrative of the present invention and are not to be considered as limiting. Unless otherwise noted, the percentages therein are by weight per liter of water.

EXAMPLE 1

*Brevibacterium ammoniagenes* iXG-21 ATCC 21264, which is obtained from *Brevibacterium ammoniagenes* ATCC 6872 by irradiation with ultraviolet rays, is employed as the seed strain. It requires adenine for its growth. The mutant is subjected to culturing with aerobic shaking at 30° C. for 24 hours in a culture medium (pH 7.2) containing 2 percent of glucose, 1 percent of peptone, 1 percent of yeast extract and 0.3 percent of sodium chloride in order to obtain a seed culture.

20-ml. portions of the seed medium or the fermentation medium described below are poured into conical flasks of 250-ml. volume and are sterilized at 120° C. for 10 minutes under an elevated pressure.

A fermentation medium having the following composition is prepared:
10% glucose
0.6% urea
1.0% $K_2HPO_4$
1.0 $KH_2PO_4$
1.0% $MgSO_4 \cdot 7H_2O$
0.01% $CaCl_2 \cdot 2H_2O$
30 μg./l biotin
20 mg./l adenine
5 mg./l vitamin $B_1$
10 mg./l calcium pantothenate
100% meat extract The pH value of the fermentation medium is adjusted to 7.8 by the use of dilute sodium hydroxide before sterilization.

Before inoculating the seed culture into the fermentation medium, 5'-xanthylic acid (80 percent purity) is added to the fermentation medium in an amount necessary to give a concentration of 20 mg./ml. The seed culture is inoculated into a fermentation medium in the amount of 10 percent by volume, based on the amount of fermentation medium.

Culturing is then carried out with aerobic shaking of the culture at 30° C. After 72 hours of culturing, the pH value of the liquor is adjusted to 7.5 with dilute ammonia water. The fermentation is completed after 120 hours of culturing.

After the completion of fermentation, 13 mg./ml. of inosine, 3.4 mg./ml. of 5'-GMP, 2.8 mg./ml. of 5'-GDP and 7.7 mg./ml. of 5'-GTP are found to be accumulated in the culture liquor. In addition, the accumulation of small amounts of guanosine, guanine and hypoxanthine, respectively, is observed. A small amount of residual 5'-xanthylic acid remains in the medium.

EXAMPLE 2

*Brevibacterium ammoniagenes* iXG-21 ATCC 21264 is used as the seed micro-organism. The seed strain is cultured in the same manner as described in Example 1 in order to obtain a seed culture.

The fermentation medium employed has the following composition:
13% starch-saccharified liquor (calculated as glucose)
0.6% urea
0.5% $KH_2PO_4$
0.5% $K_2HPO_4$
0.5% $MgSO_4 \cdot 7H_2O$
0.01% $CaCl_2 \cdot 2H_2O$
10 mg./l $FeSO_4 \cdot 7H_2O$
1 mg./l $ZnSO_4 \cdot 7H_2O$
5 mg./l $MnCl_2 \cdot 4H_2O$
5 mg./l vitamin $B_1$
10 mg./l calcium pantothenate
30 mg./l adenine
30 μg./l biotin
1.0% casamino acid The seed culture liquor in an amount of 10 percent by volume is inoculated into the fermentation medium. Culturing is then out with aerobic shaking of the culture at 35° C. for 72 hours. At this point, an equal amount of 5'-xanthylic acid-containing fermentation liquor (containing 30 mg./ml. of 5'-xanthylic acid) is added to the culture liquor. In addition, 3.0 mg./ml. of Nimean S-215 (manufactured by Nippon Yushi Co. Ltd.), a surface-active agent, is added to the liquor. Culturing is then continued for a further 48 hours. During the culturing an ammonium sulfate solution is added in an amount necessary to give a final concentration of 0.5 percent. Thereafter, the pH value is adjusted to 7.8 with dilute sodium hydroxide.

After the completion of fermentation, 6.8 mg./ml. of inosine, 7.4 mg./ml. of 5'-GMP and 3.4 mg./ml. of 5'-GTP are accumulated in the liquor. Moreover, the accumulation of small amounts of 5'-GDP, guanine and guanosine, respectively, is observed. Only a small amount of residual 5'-xanthylic acid remains in the culture liquor.

EXAMPLE 3

*Corynebacterium glutamicum* iXG-31 ATCC 21266, a mutant strain obtained by treating *Corynebacterium glutamicum* ATCC 13032 with nitrosoguanidine, is employed as the seed strain. The characteristic of this strain is that its growth is considerably accelerated by adenine, guanine or hypoxanthine.

A fermentation medium having the following composition is employed:
13% glucose
1.0% $KH_2PO_4$
1.0% $K_2HOP_4$
1.0% $MgSO_4 \cdot 7H_2O$
1.5% $NH_4cl$.
0.5% yeast extract
3% $CaCO_3$ The $CaCO_3$ is added after sterilization. The pH of the medium is 7.3.

The seed culture is inoculated into the fermentation medium in the amount of 10 percent by volume. Moreover, 20 mg./ml. of 5'-xanthylic acid is added to the medium at the time of inoculation. The other conditions employed are the same as described in Example 1. Culturing is carried out with aerobic shaking for 120 hours. During culturing, a 20 percent urea solution is used for adjusting the pH value.

As a result of the fermentation, the accumulation of 9.7 mg./ml. of inosine, 6.4 mg./ml. of 5'-GMP, 4.2 mg./ml. of 5'-GDP and 3.8 mg./ml. of 5'-GTP, respectively, is observed in the culture liquor. In addition, the presence of a small amount of remaining 5'-xanthylic acid is found in the liquor.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing inosine and 5'-gyanylic acid nucleotides which comprises culturing a micro-organism belonging to *Brevibacterium ammoniagenes* or *Corynebacterium glutamicum*, said micro-organism being capable of producing inosine and having the capacity of converting 5'-xanthylic acid into 5'-guanylic acid nucleotides, under aerobic conditions in an aqueous nutrient medium containing 5'-xanthylic acid, accumulating both inosine and the 5'-guanylic acid nucleotides in the resultant culture liquor, and recovering said inosine and 5'-guanylic acid nucleotides therefrom.

2. The process of claim 1, wherein culturing is carried out at a temperature of about 20° to 40° C. and at a pH of about 5 to 9.

3. The process of claim 1, wherein said 5'-guanylic acid nucleotides are selected from the group consisting of 5'-guanosine-1-phosphoric acid, 5'-guanosine-2-phosphoric acid and 5'-guanosine-3-phosphoric acid.

4. The process of claim 1, wherein said nutrient medium also contains a surface-active agent.

5. The process of claim 1, wherein the 5'-xanthylic acid is added to the medium at the initiation of culturing.

6. The process of claim 1, wherein the 5'-xanthylic acid is added to the medium after the initiation of culturing and during the culturing period.

7. The process of claim 1, wherein the amount of 5'-xanthylic acid present in the medium is about 5.0 to 30.0 mg./ml.

8. The process of claim 1, wherein a culture liquor containing 5'-xanthylic acid is added to said medium.

9. The process of claim 2, wherein said micro-organism is *Brevibacterium ammoniagenes* ATCC 21264.

10. The process of claim 2, wherein said micro-organism is *Corynebacterium glutamicum* ATCC 21266.

11. A process for producing inosine and 5'-guanylic acid nucleotides which comprises culturing a micro-organism selected from the group consisting of *Brevibacterium ammoniagenes* ATCC 21264 and *Corynebacterium glutamicum* ATCC 21266 under aerobic conditions in an aqueous nutrient medium containing 5'-xanthylic acid, accumulating both inosine and the 5'-guanylic acid nucleotides in the resultant culture liquor, and recovering said inosine and 5'-guanylic acid nucleotides therefrom.

12. The process of claim 11, wherein culturing is carried out at a temperature of about 20° to 40° C. and at a pH of about 5 to 9.

13. The process of claim 12, wherein said 5'-guanylic acid nucleotides are selected from the group consisting of 5'-guanosine-1-phosphoric acid, 5'-guanosine-2-phosphoric acid and 5'-guanosine-3-phosphoric acid.

14. The process of claim 13, where said nutrient medium also contains a surface-active agent.

15. The process of claim 13, wherein the amount of 5'-xanthylic acid present in the medium is about 5.0 to 30.0 mg./ml.